United States Patent
Kim et al.

(10) Patent No.: US 12,327,684 B2
(45) Date of Patent: Jun. 10, 2025

(54) METHOD OF MANUFACTURING MULTILAYER CAPACITOR

(71) Applicant: SAMSUNG ELECTRO-MECHANICS CO., LTD., Suwon-si (KR)

(72) Inventors: Min Seop Kim, Suwon-si (KR); Ji Hong Jo, Suwon-si (KR); Kyoung Jin Cha, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 133 days.

(21) Appl. No.: 17/959,575

(22) Filed: Oct. 4, 2022

(65) Prior Publication Data

US 2023/0170141 A1   Jun. 1, 2023

(30) Foreign Application Priority Data

Nov. 25, 2021 (KR) .................. 10-2021-0164108

(51) Int. Cl.
  *H01G 4/012* (2006.01)
  *H01G 4/12* (2006.01)
  *H01G 4/30* (2006.01)

(52) U.S. Cl.
  CPC .......... *H01G 4/012* (2013.01); *H01G 4/12* (2013.01); *H01G 4/30* (2013.01)

(58) Field of Classification Search
  CPC .......... H01G 4/012; H01G 4/12; H01G 4/30; H01G 13/00; H01G 4/1209; Y02E 60/13
  See application file for complete search history.

(56) References Cited

U.S. PATENT DOCUMENTS

| | | | |
|---|---|---|---|
| 7,593,215 B2 | 9/2009 | Lee et al. | |
| 7,737,006 B2 * | 6/2010 | Colfer | H01L 21/02686 438/502 |
| 2006/0213603 A1 * | 9/2006 | Lee | H01G 4/30 427/256 |

(Continued)

FOREIGN PATENT DOCUMENTS

| | | | | |
|---|---|---|---|---|
| CN | 1523619 B | * | 5/2010 | ............ H01G 4/30 |
| JP | 2006-019507 A | | 1/2006 | |

(Continued)

OTHER PUBLICATIONS

He et.al., Recent Progress in 3D Printed Mold-Based Sensors, Sensors, vol. 20, 2020, pp. 1-28 (Year: 2020).*

(Continued)

*Primary Examiner* — Aneeta Yodichkas
*Assistant Examiner* — Jose K Abraham
(74) *Attorney, Agent, or Firm* — MORGAN, LEWIS & BOCKIUS LLP (57) ABSTRACT

A method of manufacturing a multilayer capacitor includes preparing a guide frame, forming at least one dielectric layer between at least two surfaces of the guide frame such that at least a portion of each side surface of the at least one dielectric layer is in contact with the at least two surfaces, forming at least one internal electrode on an upper surface of the at least one dielectric layer between at least two surfaces of the guide frame using an inkjet printing method, and separating at least two surfaces of the guide frame from the at least one dielectric layer.

10 Claims, 11 Drawing Sheets

(56) References Cited

U.S. PATENT DOCUMENTS

| | | | |
|---|---|---|---|
| 2006/0215349 A1* | 9/2006 | Lee | H01G 4/232 |
| | | | 361/311 |
| 2006/0221542 A1 | 10/2006 | Lee | |
| 2006/0237719 A1* | 10/2006 | Colfer | H01L 29/66765 |
| | | | 257/E21.414 |
| 2007/0153051 A1 | 7/2007 | Lee | |
| 2010/0002359 A1* | 1/2010 | Lee | H01G 13/006 |
| | | | 361/321.2 |
| 2011/0207328 A1* | 8/2011 | Speakman | H10K 71/221 |
| | | | 438/694 |
| 2012/0049877 A1* | 3/2012 | Rathburn | H05K 7/1061 |
| | | | 29/842 |
| 2013/0051018 A1* | 2/2013 | Mostoller | H05K 1/056 |
| | | | 362/249.02 |
| 2013/0078860 A1* | 3/2013 | Rathburn | H01R 12/7082 |
| | | | 439/700 |
| 2013/0149436 A1* | 6/2013 | Hsieh | H01G 9/028 |
| | | | 427/80 |
| 2013/0328026 A1* | 12/2013 | Bhansali | H10K 85/1135 |
| | | | 257/40 |
| 2019/0148079 A1* | 5/2019 | Frank | H01G 9/048 |
| | | | 361/524 |
| 2021/0074476 A1 | 3/2021 | Kubota | |

FOREIGN PATENT DOCUMENTS

| | | | |
|---|---|---|---|
| JP | 2021-044317 A | | 3/2021 |
| KR | 10-2006-0102572 A | | 9/2006 |
| KR | 10-2006-0104373 A | | 10/2006 |
| KR | 10-2007-0073392 A | | 7/2007 |
| KR | 20180013028 A | * | 2/2018 |
| SG | 10201804270 | * | 7/2018 |

OTHER PUBLICATIONS

Li et.al., 3D printed stretchable capacitive sensors for highly sensitive tactile and electrochemical sensing, Nanotechnology, vol. 29, 2018, p. 185501 (Year: 2018).*

Salim et.al., Review of Recent Inkjet-Printed Capacitive Tactile Sensors, Sensors 2017, 17, 2593 (Year: 2017).*

Office Action issued in corresponding Korean Patent Application No. 10-2021-0164108 on Apr. 3, 2025, with English translation.

* cited by examiner

METHOD OF MANUFACTURING MULTILAYER CAPACITOR

CROSS-REFERENCE TO RELATED APPLICATIONS

This application claims the benefit of priority to Korean Patent Application No. 10-2021-0164108 filed on Nov. 25, 2021 in the Korean Intellectual Property Office, the disclosures of which are incorporated herein by references in its entirety.

BACKGROUND

1. Technical Field

The present disclosure relates to a multilayer capacitor and a method of manufacturing the same.

2. Description of Related Art

A multilayer capacitor has been widely used as a component of electronic devices such as computers, PDAS, mobile phones, and the like, as a multilayer capacitor may have a small size and high capacitance, and may be easily mounted, and a multilayer capacitor has also been used as one of components of electrical devices (including vehicles) as a multilayer capacitor may have high reliability and high strength.

SUMMARY

An aspect of the present disclosure is to provide a multilayer capacitor which may have a reduced size while retaining performance (e.g., capacitance, manufacturing costs, reliability, withstand voltage, and mounting efficiency), and a method of manufacturing the same.

According to an aspect of the present disclosure, a method of manufacturing a multilayer capacitor may include preparing a guide frame; forming at least one dielectric layer between at least two surfaces of the guide frame such that at least a portion of each side surface of the at least one dielectric layer is in contact with the at least two surfaces; forming at least one internal electrode on an upper surface of the at least one dielectric layer between at least two surfaces of the guide frame using an inkjet printing method; and separating at least two surfaces of the guide frame from the at least one dielectric layer.

According to another aspect of the present disclosure, a multilayer capacitor may include a body having a laminate structure in which at least one first internal electrode and at least one second internal electrode are alternately laminated in a first direction with at least one dielectric layer interposed therebetween; and first and second external electrodes disposed on the body and spaced apart from each other to be connected to the at least one first internal electrode and the at least one second internal electrode, respectively. A thickness of each of the at least one first internal electrode and the at least one second internal electrode, defined as $T_E$, may be 0.25 μm or less. A first air gap may be disposed between the at least one second internal electrode and the first external electrode in a second direction. A second air gap may be disposed between the at least one first internal electrode and the second external electrode in the second direction. On one surface of the body taken in the first direction, a slope, taken in the second direction, of a portion of the one surface of the body in an overlapping portion between the at least one second internal electrode and the first external electrode in the first direction may be $\theta1$, and a slope, taken in the second direction, of a portion of the one surface of the body in an overlapping portion between the at least one first internal electrode and the second external electrode in the first direction may be $\theta2$. Then, $\{(\theta1+\theta2)/2\}$ may be greater than 0 degree and less than 15 degrees.

According to still another aspect of the present disclosure, a multilayer capacitor may include a body including a laminate structure in which a plurality of first internal electrodes and a plurality of second internal electrodes are alternately laminated in a first direction with at least one dielectric layer interposed therebetween; and first and second external electrodes disposed on the body and spaced apart from each other in a second direction to be connected to the plurality of first internal electrodes and the plurality of second internal electrodes, respectively. A thickness of each of the plurality of first and second internal electrodes, defined as $T_E$, may be 0.25 μm or less. The body may further include a first side margin portion interposed between ends of the plurality of second internal electrodes and the first external electrode in the second direction, and a second side margin portion interposed between ends of the plurality of first internal electrodes and the second external electrode in the second direction. End portions of the body in the second direction may be bent downwardly in the first direction. A bent angle of an upper surface of the first side margin portion with respect to a center of one surface of the body in the first direction may be $\theta1$, and a bent angle of an upper surface of the second side margin portion with respect to the center of the one surface of the body may be $\theta2$. Then, $\{(\theta1+\theta2)/2\}$ may be greater than 0 degree and less than 15 degrees. An average distance, defined as $T_B$, between adjacent ones of the plurality of first internal electrodes at the first side margin portion and between adjacent ones of the plurality of second internal electrodes at the second side margin portion may be less than a distance between adjacent ones of the plurality of first or second internal electrodes at a center portion of the body.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described as follows with reference to the attached drawings.

These embodiments are described in sufficient detail to enable those skilled in the art to practice the invention. It is to be understood that the various embodiments of the invention, although different, are not necessarily mutually exclusive. For example, structures, shapes, and sizes described as examples in embodiments in the present disclosure may be implemented in another example embodiment without departing from the spirit and scope of the present disclosure. Further, modifications of positions or arrangements of elements in example embodiments may be made without departing from the spirit and scope of the present disclosure. The following detailed description is, therefore, not to be taken in a limiting sense, and the scope of the present invention are defined only by appended claims, appropriately interpreted, along with the full range of equivalents to which the claims are entitled.

In the drawings, same elements will be indicated by same reference numerals. Also, redundant descriptions and detailed descriptions of known functions and elements that may unnecessarily make the gist of the present disclosure obscure will be omitted. In the accompanying drawings, some elements may be exaggerated, omitted or briefly illustrated, and the sizes of the elements do not necessarily reflect the actual sizes of these elements.

The terms, "include," "comprise," "is configured to," or the like of the description are used to indicate the presence of features, numbers, steps, operations, elements, portions or combination thereof, and do not exclude the possibilities of combination or addition of one or more features, numbers, steps, operations, elements, portions or combination thereof.

As for the directions of a hexahedron, L, W, and T in the drawings may indicate a length direction, a width direction, and a thickness direction, respectively. The thickness direction may be a lamination direction (or a first direction) in which the dielectric layers are laminated.

In the description below, a multilayer capacitor according to an example embodiment will be described, and particularly, a multilayer ceramic capacitor (MLCC) will be described, but an example embodiment thereof is not limited thereto.

Figure 1:
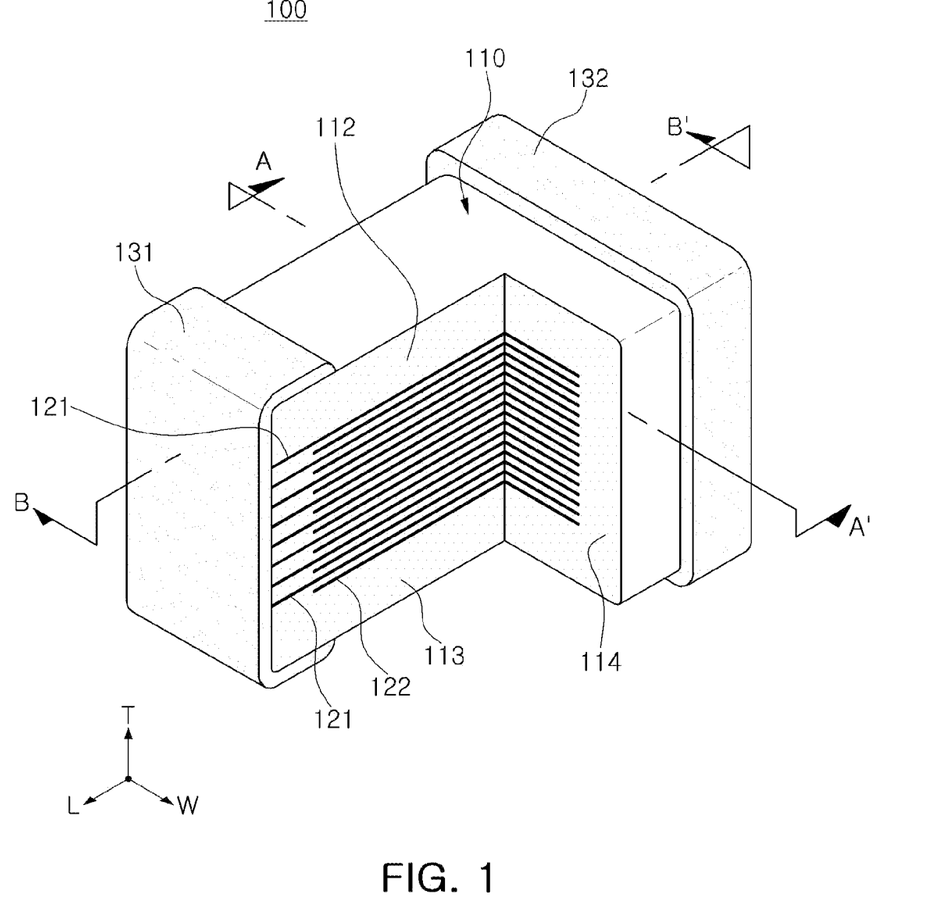
FIG. 1 is a perspective diagram illustrating a multilayer capacitor according to an example embodiment of the present disclosure.
Figure 2:
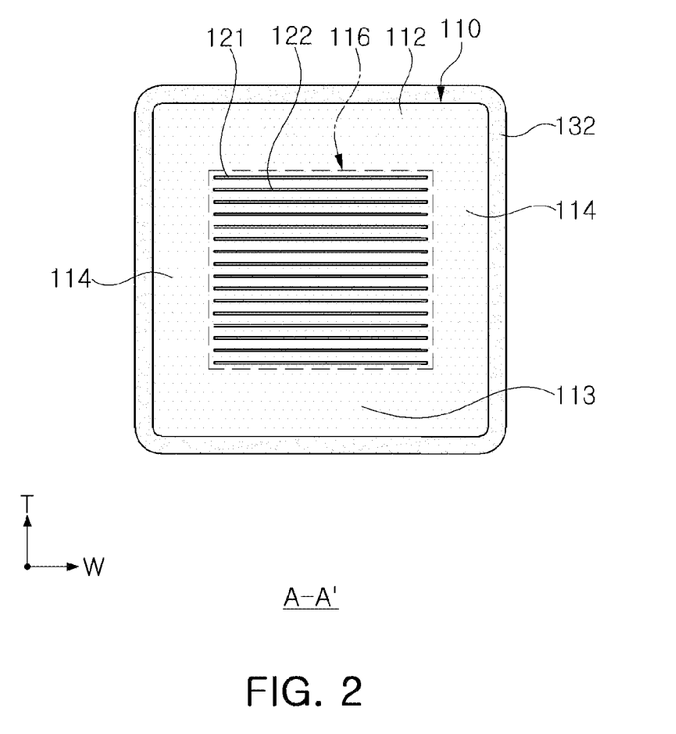
FIG. 2 is a cross-sectional diagram taken along line A-A' in FIG. 1.
Figure 3:
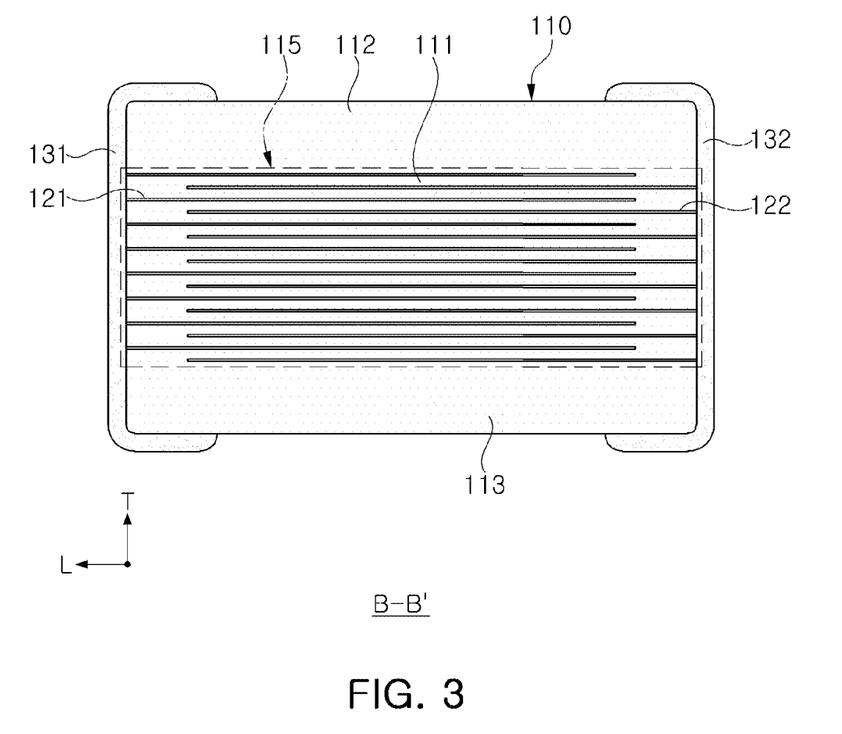
FIG. 3 is a cross-sectional diagram taken along line B-B' in FIG. 1.

FIG. 1 is a perspective diagram illustrating a multilayer capacitor according to an example embodiment. FIG. 2 is a cross-sectional diagram taken along line A-A' in FIG. 1. FIG. 3 is a cross-sectional diagram taken along line B-B' in FIG. 1. FIG. 1 illustrates the body 110 from which a ¼ portion is cut out in volume to view the internal portion of the body 110, but the actual multilayer capacitor 100 may not be cut out by ¼ in volume, and may be symmetrical with respect to the L direction, the W direction, and the T direction.

Referring to FIGS. 1, 2 and 3, the multilayer capacitor 100 according to an example embodiment may include a body 110, a first external electrode 131, and a second external electrode 132.

The body 110 may include a laminate structure in which at least one first internal electrode 121 and at least one second internal electrode 122 are alternately laminated in a first direction (e.g., the T direction) with at least one dielectric layer 111 interposed therebetween.

For example, the body 110 may be configured as a ceramic body by baking the laminate structure. The at least one dielectric layer 111 disposed on the body 110 may be in a sintered state, and the boundary between dielectric layers adjacent to each other may be integrated such that it may be difficult to identify the boundary without using a scanning electron microscope (SEM).

For example, the body 110 may be formed as a hexahedron having both side surfaces in the length direction L, both side surfaces in the width direction W, and both side surfaces in the thickness direction T. The edges and/or corners may be rounded by being polished. However, the shape and the dimension of the body 110 and the number of laminated dielectric layers 111 are not limited to the illustrated examples.

The thickness of the at least one dielectric layer 111 may be arbitrarily changed according to the design of capacitance of the multilayer capacitor 100, and the dielectric layer 111 may include ceramic powder having a high dielectric constant, such as, for example, a barium titanate ($BaTiO_3$) powder, but an example embodiment thereof is not limited thereto. Also, various ceramic additives (e.g., MgO, $Al_2O_3$, $SiO_2$, ZnO), an organic solvent, a plasticizer, a binder, a dispersant, or the like, may be added to the ceramic powder according to the required configuration of the multilayer capacitor 100.

An average particle diameter of the ceramic powder used to form the at least one dielectric layer 111 may not be limited to any particular example, and may be adjusted the configuration according to required (e.g., miniaturization and/or high capacity may be required as in a capacitor for electronic devices, or high withstand voltage properties and/or high strength may be required as in a capacitor for electrical devices), and may be adjusted to be, for example, 400 nm or less.

For example, the at least one dielectric layer 111 may be formed by forming a plurality of ceramic sheets by applying slurry including powder such as barium titanate ($BaTiO_3$) on a carrier film and drying the slurry. The ceramic sheet may be formed by preparing the slurry by mixing ceramic powder, a binder, and a solvent, and forming the slurry into a sheet having a thickness of several μm by a doctor blade method, but an example embodiment thereof is not limited thereto.

The at least one first internal electrode 121 and the at least one second internal electrode 122 may be formed by printing a conductive paste including a conductive metal and may be alternately exposed to one side surface and the other side surface of the body 110 in the lamination direction (e.g., the T direction) of the dielectric layers, and may be electrically insulated from each other by the dielectric layer interposed therebetween.

For example, each of the at least one first internal electrode 121 and the at least one second internal electrode 122 may be formed by a conductive paste for internal electrodes including 40 to 50 wt % of conductive metal powder having an average particle size of 0.1 to 0.2 µm, but an example embodiment thereof is not limited thereto. The conductive paste may be nickel (Ni), copper (Cu), palladium (Pd), silver (Ag), lead (Pb), or platinum (Pt), or an alloy thereof, but an example embodiment thereof is not limited thereto.

For example, an internal electrode pattern may be formed by applying the conductive paste for an internal electrode on the ceramic sheet by a printing method. The method of printing the conductive paste may be an inkjet printing method, but an example embodiment thereof is not limited thereto. For example, the body 110 may be manufactured by laminating in 200 to 300 layers of ceramic sheets on which the internal electrode pattern is printed, and pressing and baking the ceramic sheets.

Capacitance of the multilayer capacitor 100 may be proportional to an overlapping region between the at least one first internal electrode 121 and the at least one second internal electrode 122 in the lamination direction (e.g., in the T direction), may be proportional to a total number of laminated layers of the at least one first internal electrode 121 and the at least one second internal electrode 122, and may be inversely proportional to a distance between the at least one first internal electrode 121 and the at least one second internal electrode 122. The distance between the internal electrodes may be substantially the same as a thickness of each of the at least one dielectric layer 111.

The multilayer capacitor 100 may have a larger capacitance for a thickness thereof as the distance between the at least one first internal electrode 121 and the at least one second internal electrode 122 decreases, whereas the withstand voltage of the multilayer capacitor 100 may be higher as the distance between the internal electrodes increases. Accordingly, the distance between the internal electrodes may be adjusted according to the required configuration (e.g., miniaturization and/or high capacity may be required as in a capacitor for electronic devices, or high withstand voltage properties and/or high strength may be required as in a capacitor for electrical devices). The thickness of each of the at least one first internal electrode 121 and the at least one second internal electrode 122 may also be affected by the distance between the internal electrodes.

For example, when high withstand voltage properties and/or high strength are required for the multilayer capacitor 100, the distance between the at least one first internal electrode 121 and the at least one second internal electrode 122 may be configured to exceed twice the thickness of each of the first internal electrode 121 and the second internal electrode 122. For example, when high withstand voltage properties and/or high strength are required for the multilayer capacitor 100, the thickness of each of the at least one first internal electrode 121 and the at least one second internal electrode 122 may be configured to be 0.4 µm or less and the total number of layers of the internal electrodes may be configured to be 400 or more.

The first and second external electrodes 131 and 132 may be disposed in the body 110 to be spaced apart from each other so as to be connected to the at least one first internal electrode 121 and the at least one second internal electrode 12, respectively.

For example, each of the first and second external electrodes 131 and 132 may be formed by a method of dipping in a paste including a metal component, a method of printing a conductive paste, a sheet transfer, a pad transfer method, a sputter plating method, or electrolytic plating method. For example, the first and second external electrodes 131 and 132 may include a baked layer formed as the paste is baked and a plating layer formed on an external surface of the baked layer, and a conductive resin layer may be further included between the baked layer and the plating layer. For example, the conductive resin layer may be formed as conductive particles are included in a thermosetting resin such as epoxy. The metal component may be copper (Cu), palladium (Pd), platinum (Pt), gold (Au), silver (Ag), lead (Pb), or tin (Sn), or an alloy thereof, but an example embodiment thereof is not limited thereto.

The multilayer capacitor 100 may be mounted or embedded in an external substrate (e.g., a printed circuit board), and may be electrically connected to a circuit (e.g., an integrated circuit, a processor) electrically connected to the external substrate by being connected to at least one of a wiring, a land, a solder and a bump of the external substrate through the first and second external electrodes 131 and 132.

Referring to FIGS. 1, 2 and 3, the body 110 may include an upper cover layer 112, a lower cover layer 113, and a core region 115, and a core region 115 may include a margin region 114 and a capacitance region 116.

The upper and lower cover layers 112 and 113 may be disposed with the core region 115 interposed therebetween in the first direction (e.g., the T direction) and may have a thickness greater than a thickness of each of the at least one dielectric layer 111.

The upper and lower cover layers 112 and 113 may prevent external environmental elements (e.g., moisture, plating solution, foreign substances) from permeating the core region 115, may protect the body 110 from external impacts, and may also improve warpage strength of the body 110.

For example, the upper and lower cover layers 112 and 113 may include a material the same as the material of the at least one dielectric layer 111 or a material (e.g., a thermosetting resin such as an epoxy resin) different from the material of the at least one dielectric layer 111.

The capacitance region 116 may form the capacitance of the multilayer capacitor 100 by including a region between the at least one first internal electrode 121 and the at least one second internal electrode 122.

The capacitive region 116 may including a laminate structure in which the at least one first internal electrode 121 and the at least one second internal electrode 122 are alternately laminated in the first direction (e.g., a T-direction) with the at least one dielectric layer 111 interposed therebetween, and may have the same dimension as that of the laminate structure.

The margin region 114 may include a boundary line between the at least one first internal electrode 121 and the at least one second internal electrode 122 and a region between the surfaces of the body 110.

The plurality of margin regions 114 may be disposed with the capacitance region 116 interposed therebetween in a second direction (e.g., W direction) perpendicular to the first direction (e.g., T direction). For example, the plurality of margin regions 114 may be formed by a method similar to the method forming the at least one dielectric layer 111 (the lamination directions may be different).

The plurality of margin regions 114 may prevent the at least one first internal electrode 121 and the at least one second internal electrode 122 from exposing to the surface of the body 110 in the second direction (e.g., W direction), such that the external environmental elements (e.g., moisture, plating solution, foreign substances) may be prevented from permeating the at least one first internal electrode 121 and the at least one second internal electrode 122 through the surface in the second direction, and reliability and lifespan of the multilayer capacitor 100 may improve. Also, the at least one first internal electrode 121 and the at least one second internal electrode 122 may efficiently expand in the second direction due to the the plurality of margin regions 114, and accordingly, plurality of margin regions 114 may increase the overlapping region between the at least one first internal electrode 121 and the at least one second internal electrode 122, thereby contributing to improving the capacitance of the multilayer capacitor 100.

Figure 4:
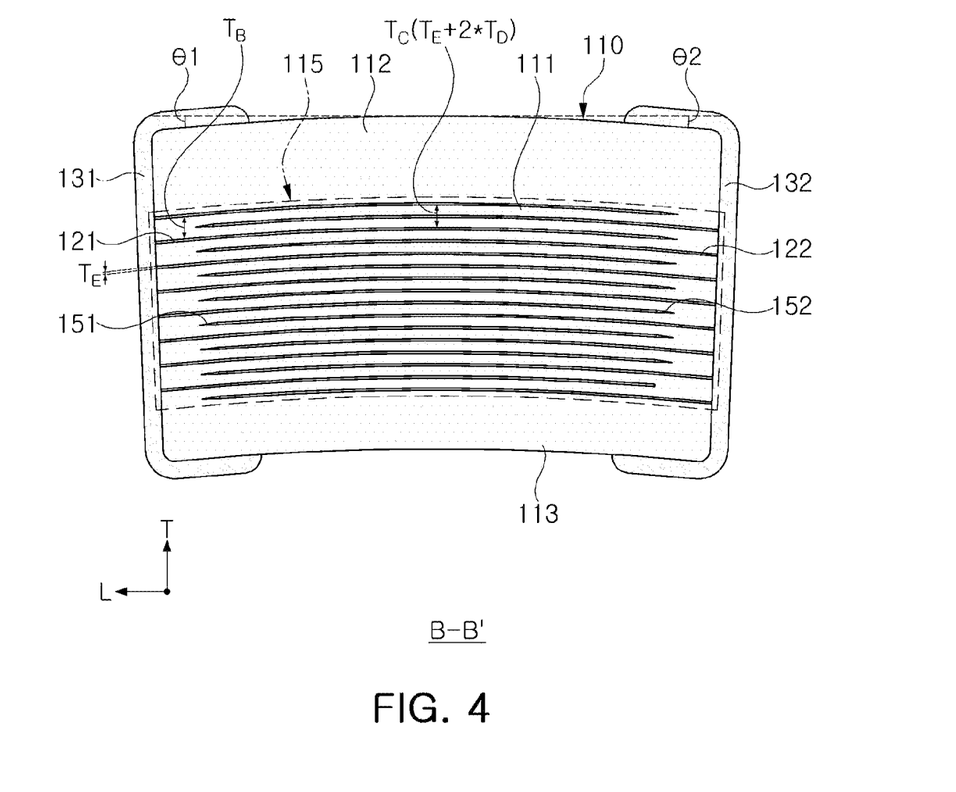
FIG. 4 is a cross-sectional diagram illustrating a structure for miniaturization of a multilayer capacitor according to an example embodiment of the present disclosure.

FIG. 4 is a cross-sectional diagram illustrating a structure for miniaturization of a multilayer capacitor according to an example embodiment.

Referring to FIG. 4, the multilayer capacitor according to an example embodiment may include at least one first internal electrode 121 and at least one second internal electrode 122 each having a thickness $T_E$ of 0.25 µm or less, such that the multilayer capacitor may be miniaturized. That is because, as the thickness $T_E$ decreases, the thickness $T_D$ of the at least one dielectric layer 111 may also decrease, and a thickness of each of the upper and lower cover layers 112 and 113 and the first and second external electrodes 131 and 132 may be reduced.

For example, a length of the miniaturized body 110 in a direction (e.g., the L direction) in which the first and second external electrodes 131 and 132 oppose each other may be less than 800 µm (e.g., 600 µm or less), and a width of the miniaturized body 110 in a direction (e.g., W direction) perpendicular to the above-mentioned direction and the first direction (e.g., T direction) may be less than 400 µm (e.g., 300 µm or less).

For example, the at least one first internal electrode 121 and the at least one second internal electrode 122 may be formed using an inkjet printing method to have a reduced thickness $T_E$ such as 0.25 µm or less. By using the inkjet printing method, viscosity and/or the printing position of the conductive paste may be determined flexibly with precision as compared to other printing methods (e.g., screen-printing, gravure printing), such that printing resolution of the at least one second internal electrode 122 and the at least one second internal electrode 122 may improve. Reliability (e.g., connectivity, withstand voltage, or the like) of the thickness $T_E$ of the at least one second internal electrode 122 and the at least one second internal electrode 122 may increase as the printing resolution increases.

Accordingly, when the thickness $T_E$ of each of the at least one first internal electrode 121 and the at least one second internal electrode 122 is 0.25 µm or less, it may be highly likely that the at least one first internal electrode 121 and the at least one second internal electrode 122 may be formed using an inkjet printing method, but an example embodiment thereof is not limited thereto. For example, even when the at least one first internal electrode 121 and the at least one second internal electrode 122 have a thickness $T_E$ of 0.25 µm or less, the internal electrodes may be formed by screen printing and/or gravure printing for rapid printing. An appropriate thickness $T_E$ of the at least one first internal electrode 121 and the at least one second internal electrode 122 formed by the inkjet printing method may be 0.2 µm or more and 0.25 µm or less, but an example embodiment thereof is not limited thereto The difference in properties (e.g., a volume change rate according to baking) between the at least one dielectric layer 111 and the internal electrode may work as a limitation in improving reliability in the process of manufacturing (e.g., pressing, baking) the body 110.

A first air gap 151 may be disposed between the at least one second internal electrode 122 and the first external electrode 131, and a second air gap 152 may be disposed between the first internal electrode 121 and the second external electrode 132, in the direction (e.g., the L direction) in which the first and second external electrodes 131 and 132 oppose each other.

The first air gap 151 may be at least a portion of a margin taken in the L direction for insulation between the at least one second internal electrode 122 and the first external electrode 131, and the second air gap 152 may be at least a portion of a margin taken in the L direction for insulation between the at least one first internal electrode 121 and the second external electrode 132.

When the first and second air gaps 151 and 152 are disposed in at least a portion of the margin taken in the L direction, the first and second air gaps 151 and 152 may reduce bottleneck in the flow in the body 110 due to the difference in properties and/or the shapes between the at least one dielectric layer 111 and the internal electrode, such that reliability (a first reliability factor) in the process of manufacturing the body 110 may improve. However, the first and second air gaps 151 and 152 of the margin taken in the L direction may increasingly consider the reliability limitation (e.g., second reliability factors such as a decrease in the withstand voltage due to a decrease in the minimum distance between the internal electrodes, breakage in the vicinity of the margin of the internal electrode taken in the L direction, possibility of mounting failure due to warpage of the body) due to a step of the margin taken in the L direction. That is, the first and second reliability factors may be traded off in terms of the margin taken in the L direction.

For example, when the at least one first internal electrode 121 and the at least one second internal electrode 122 are formed by the inkjet printing method, the inkjet printer may not print on at least a portion of the margin taken in the L direction, thereby forming the first and second air gaps 151 and 152. Accordingly, the printing range may be reduced by the margin taken in the L direction, such that the body 110 may be formed swiftly at lower cost, even using the inkjet printing method.

A slope taken in the direction (e.g., the L direction) in which the first and second external electrodes 131 and 132 in the overlapping portion taken in the first direction (e.g., the T direction) between the at least one second internal electrode 122 and the first external electrode 131 on one surface (e.g., the upper surface) of the body 110 taken in the first direction (e.g., the T direction) may be defined as θ1, and a slope taken in the direction in which the first and second external electrodes 131 and 132 in the overlapping portion taken in the first direction (e.g., the T direction) between the at least one first internal electrode 121 and the second external electrode 132 on one surface (e.g., the upper surface) of the body 110 taken in the first direction (e.g., the T direction) may be defined as θ2. As the slopes θ1 and θ2 decreases, the reliability limitation due to the step of the margin taken in the L direction may increase. The first and second air gaps 151 and 152 may allow the slopes θ1 and θ2 to be greater than 0 degree, and as the first and second air gaps 151 and 152 increase, θ1 and θ2 may also increase.

According to one embodiment of the present disclosure, end portions of the body 110 in the L direction may be bent downwardly in the T direction. When a portion of the body 110 interposed between ends of the at least one second internal electrode 122 and the first external electrode 131 in the L direction is defined as a first side margin portion, and a portion of the body 110 interposed between ends of the at least one first internal electrode 121 and the second external electrode 132 in the L direction is defined as a second side margin portion, and when a bent angle of an upper surface of the first side margin portion with respect to a center of the upper surface of the body 110 in the first direction is θ1, and a bent angle of an upper surface of the second side margin portion with respect to the center of the upper surface of the body 110 is θ2, {(θ1+θ2)/2} may be greater than 0 degree and less than 15 degrees.

In one embodiment, an average distance, defined as $T_B$, between adjacent ones of the at least one first internal electrode 121 at the first side margin portion and between adjacent ones of the at least one second internal electrode 122 at the second side margin portion may be less than a distance between adjacent ones of the at least one first or second internal electrode at a center portion of the body 110.

Table 1 below lists reliability (e.g., withstand voltage, breakage of internal electrode, possibility of mounting failure due to warpage of the body) according to the slopes θ1 and θ2. "OK" in Reliability indicates that the reliability of the corresponding sample is higher than the reference reliability, and "NG" indicates that the reliability of the corresponding sample is lower than the reference reliability. Since the difference in reliability between samples 3 and 4 may be relative greater that the difference in reliability between other adjacent samples, the reliability between sample 3 and sample 4 may be a reference reliability. Alternatively, the reference reliability may be a criterion for determining whether a corresponding sample is defective.

TABLE 1

| Sample No. | {(θ1 + θ2)/2} | Reliability |
| --- | --- | --- |
| 1 | 1 degree | OK |
| 2 | 5 degrees | OK |
| 3 | 10 degrees | OK |
| 4 | 15 degrees | NG |
| 5 | 18 degrees | NG |
| 6 | 20 degrees | NG |

Referring to Table 1, the multilayer capacitor 100 according to an example embodiment may include the body 110 in which {(θ1+θ2)/2} is greater than 0 degree and less than 15 degrees, and accordingly, the multilayer capacitor 100 may have a structure in which the internal electrodes having a reduced thickness $T_E$ of 0.25 μm or less are laminated, and reliability may be secured, such that miniaturization may be implemented.

The number of laminated layers of each of the at least one first internal electrode 121 and the at least one second internal electrode 122 may be two or more, and the thickness of the at least one dielectric layer 111 in a portion overlapping a center of the body 110 in the first direction (e.g., T direction) may be defined as $T_D$. A thickness obtained by dividing a sum of a distance between the plurality of first internal electrodes 122 between the plurality of first internal electrodes 121 and the second external electrode 132 and a distance between the plurality of second internal electrodes 121 between the plurality of first internal electrodes 121 and second external electrodes 132 by two may be defined as $T_B$. $(T_E+2*T_D)$ may be $T_C$, and may be a distance between the upper internal electrode and the lower internal electrode of the three internal electrodes adjacent to each other in a portion overlapping the center of the body 110 in the first direction (e.g., T direction).

Table 2 below lists reliability (e.g., withstanding voltage, breakage of the internal electrode, possibility of mounting failure due to warpage of the body) according to {$T_B/(T_E+2*T_D)$}. As the difference in reliability between sample 10 and sample 11 may be relatively greater than the difference in reliability between other adjacent samples, the reliability between sample 10 and sample 11 may be a reference reliability.

TABLE 2

| Sample No. | {$T_B/(T_E + 2 * T_D)$} | Reliability |
| --- | --- | --- |
| 7 | 0.95 | OK |
| 8 | 0.88 | OK |
| 9 | 0.85 | OK |
| 10 | 0.8 | OK |
| 11 | 0.74 | NG |
| 12 | 0.7 | NG |

Referring to Table 2, $T_B$ of the multilayer capacitor 100 according to an example embodiment may be 0.8 times or more and less than 1 time of $(T_E+2*T_D)$. Accordingly, since the multilayer capacitor 100 has a structure in which the internal electrodes having a reduced thickness $T_E$ of 0.25 μm or less are laminated and reliability may be secured, miniaturization may be implemented.

$T_B$ and $(T_E+2*T_D)$ may be measured from a portion of the each of the plurality of first and second internal electrodes 121 and 122 including a 2% point from a portion (e.g., the upper surface of the capacitance region) the most adjacent to one surface (e.g., upper surface) of the body 110 in the first direction (e.g., T direction) to a portion farthest from one surface of the body 110.

Each of $T_B$, $T_E$, $T_D$, θ1 and θ2 may be measured in the LT plane exposed by grinding or cutting the body 110 in the W direction such that the LT plane including a central point of the body 110 is exposed, and each of $T_B$, $T_E$ and $T_D$ may be measured as an average value of the corresponding portion.

The average value may be calculated as a value obtained by integrating a portion corresponding to each of $T_B$, $T_E$, and $T_D$ in the L direction and dividing the total length of the corresponding portion in the integration direction. The number of samples used for the measurement is not limited to any particular example, and may be 10 or more and 20 or less. For example, half of the sample used for the measurement may be used for the measurement of {(θ1+θ2)/2}, and the other half may be used for the measurement of {$T_B/(T_E+2*T_D)$}.

Each of $T_B$, $T_E$, $T_D$, θ1 and θ2 may be measured based on an image obtained by applying the LT plane to the analysis using one of transmission electron microscopy (TEM), atomic force microscope (AFM), scanning electron microscope (SEM), optical microscopy, and surface profiler. For example, each of $T_B$, $T_E$, $T_D$, θ1 and θ2 may be measured by visually distinguishing the corresponding portions in the image, and may be measured by distinguishing the corresponding portions by classifying pixel values of the image. Here, processing (e.g., filtering, edge detection, or the like) for the pixel values of the image may be accompanied.

Other measurement methods and/or tools appreciated by one of ordinary skill in the art, even if not described in the present disclosure, may also be used.

Figure 5A:
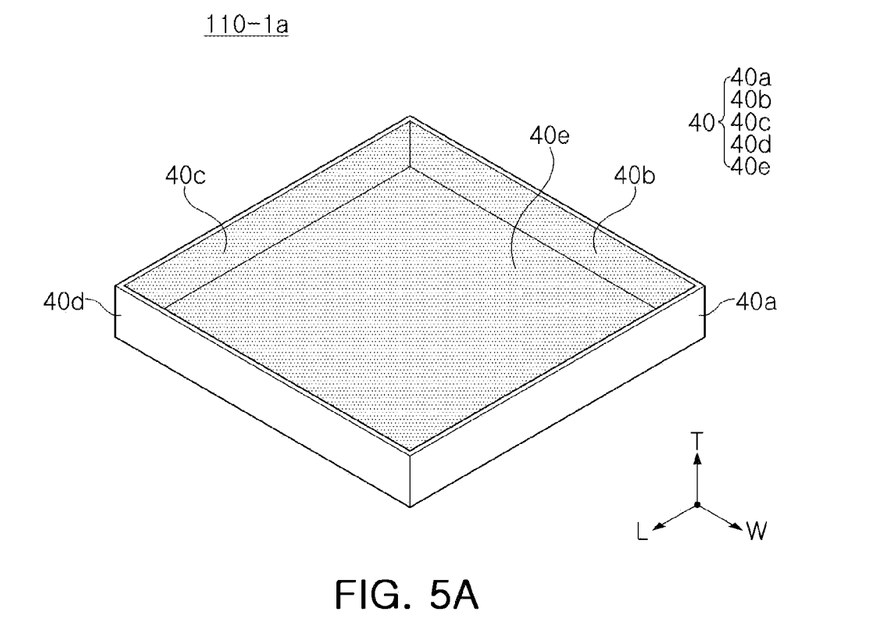
FIGS. 5A, 5B and 5C are perspective diagrams illustrating various examples of a process of preparing a guide frame with respect to a method of manufacturing a multilayer capacitor according to an example embodiment of the present disclosure.
Figure 5B:
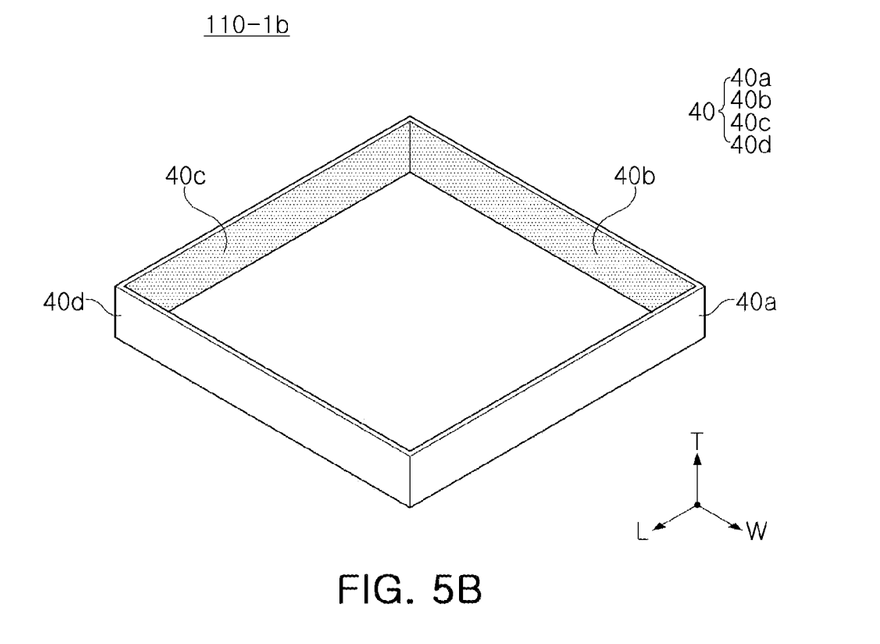
Figure 5C:
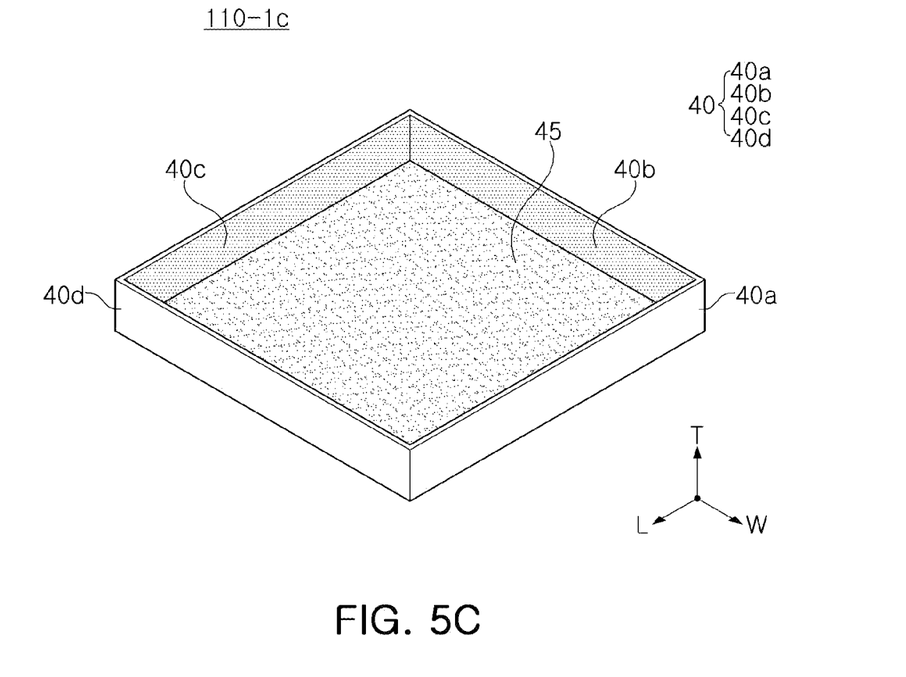

FIGS. 5A, 5B and 5C are perspective diagrams illustrating various examples of a process of preparing a guide frame of a method of manufacturing a multilayer capacitor according to an example embodiment.

Referring to FIGS. 5A, 5B and 5C, the method of manufacturing a multilayer capacitor according to an example embodiment may include processes 110-1a, 110-1b, and 110-1c of preparing a guide frame.

Referring to FIGS. 5A, 5B and 5C, a guide frame 40 may include at least four surfaces 40a, 40b, 40c, and 40d. The at least four surfaces 40a, 40b, 40c, and 40d may surround at least one dielectric layer and/or at least one internal electrode in a later process, and at least two surfaces 40a and 40c among the at least four surfaces 40a, 40b, 40c, and 40d may be in contact with each side surface of the at least one dielectric layer and/or the at least one internal electrode in the subsequent processes.

For example, the guide frame 40 may be implemented in substantially the same form as that of the body, may include a material easily separated while being in contact with at least one dielectric layer and/or at least one internal electrode, and may be implemented as a formwork.

Referring to FIGS. 5A, 5B and 5C, the guide frame 40 may further include lower surfaces 40e and 45 supporting at least one dielectric layer and at least one internal electrode. Accordingly, the guide frame 40 may further improve stability of a structure in which at least one dielectric layer and at least one internal electrode are laminated.

Referring to FIG. 5C, the lower surface 45 of the guide frame 40 may include a thermoplastic insulating material (e.g., polyethylene terephthalate (PET)), a material different from that of the at least four surfaces 40a, 40b, 40c, and 40d. Accordingly, the guide frame 40 may improve stability of the structure in which at least one dielectric layer and at least one internal electrode are laminated during an additional process (e.g., compressing and baking). For example, the lower surface 45 of the guide frame 40 may be separated from the at least four surfaces 40a, 40b, 40c, and 40d.

Figure 6A:
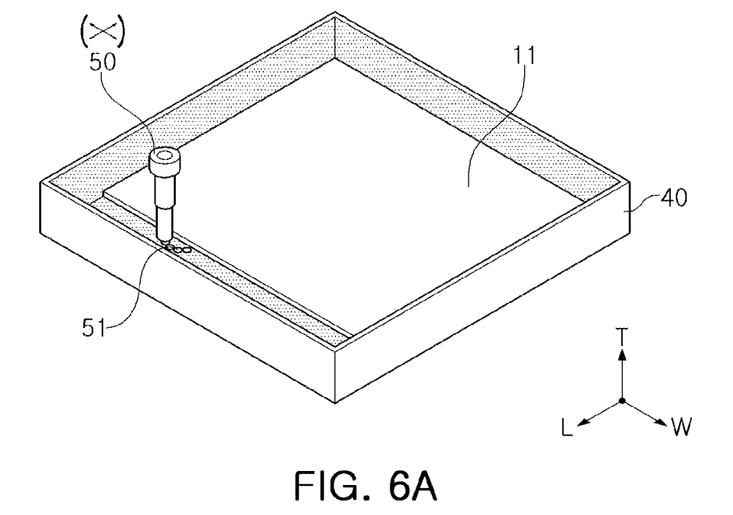
FIGS. 6A and 6B are perspective diagrams illustrating various examples of a process of forming at least one dielectric layer with respect to a method of manufacturing a multilayer capacitor according to an example embodiment of the present disclosure.
Figure 6B:
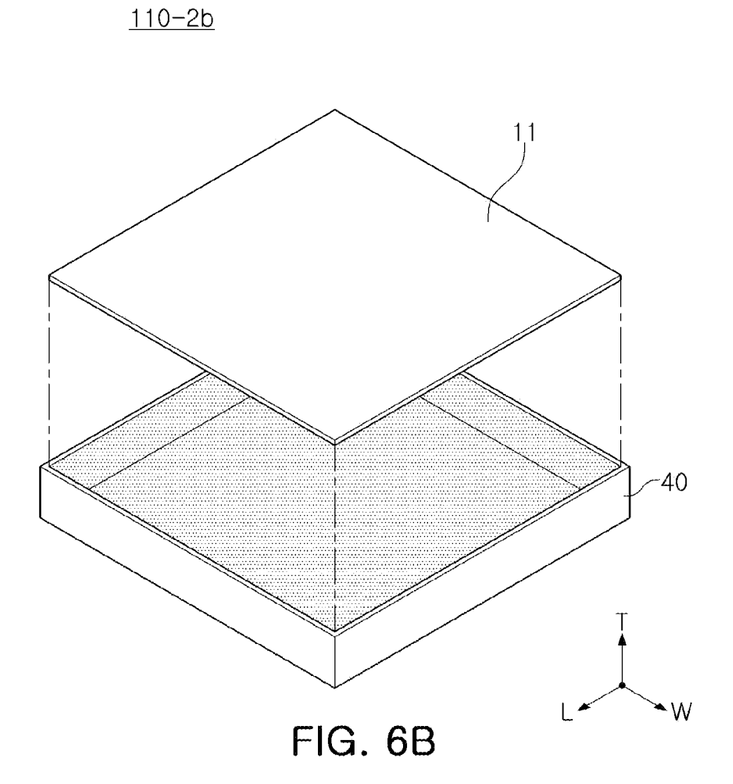

FIGS. 6A and 6B are perspective diagrams illustrating various examples of a process of forming at least one dielectric layer of a method of manufacturing a multilayer capacitor according to an example embodiment.

Referring to FIGS. 6A and 6B, the method of manufacturing a multilayer capacitor according to an example embodiment may include processes 110-2a and 110-2b of forming at least one dielectric layer 11 such that at least a portion of each side surface thereof may be in contact with at least two surfaces of the guide frame 40 between the at least two surfaces.

Accordingly, since the guide frame 40 may maintain the shape of the at least one dielectric layer 11, $\{(\theta 1+\theta 2)/2\}$ in Table 1 may be reduced to more than 0 degree and less than 15 degrees, or $\{T_B/(T_E+2*T_D)\}$ in Table 2 may be increased to 0.8 or more and less than 1.

Referring to FIG. 6A, the process 110-2a of forming the at least one dielectric layer 11 may include forming the at least one dielectric layer 11 using an inkjet printing method. The inkjet printing method may be a method of spraying a dielectric material 51 in a dielectric inkjet printhead 50 while the dielectric inkjet printhead 50 moves in the L direction and the W direction. The dielectric 51 may be in a droplet state, and may be discharged through an outlet of the dielectric inkjet print head 50.

Referring to FIG. 6B, at least one dielectric layer 11 may be implemented as a ceramic sheet in advance and may be inserted into the guide frame 40.

FIGS. 7A, 7A, 7B, 7C and 7D are perspective diagrams illustrating various examples of a process of forming at least one internal electrode of a method of manufacturing a multilayer capacitor according to an example embodiment.

Referring to FIGS. 7A, 7A, 7B, 7C and 7D, the method for manufacturing a multilayer capacitor according to an example embodiment may include processes 110-3a, 110-3b, 110-3c, and 110-3d of forming at least one internal electrode 20 on the upper surface of at least one dielectric layer 11 between at least two surfaces of the guide frame 40 using an inkjet printing method. The at least one internal electrode 20 may be formed to have a thickness of 0.25 µm or less, but an example embodiment thereof is not limited thereto. The inkjet printing method may be a method of spraying a conductive paste 61 in an internal electrode inkjet print head 60 while the internal electrode inkjet print head 60 moves in the L direction and the W direction. The conductive paste 61 may be in a droplet state, and may be discharged through an outlet of the internal electrode inkjet print head 60.

The forming at least one internal electrode illustrated in FIGS. 7A, 7A, 7B, 7C and 7D (110-3a, 110-3b, 110-3c, and 110-3d) and the forming at least one dielectric layer illustrated in FIGS. 6A and 6B (110-2a and 110-2b) may be alternately performed two or more times to form the plurality of internal electrodes 20 and the plurality of dielectric layers 11.

Figure 7A:
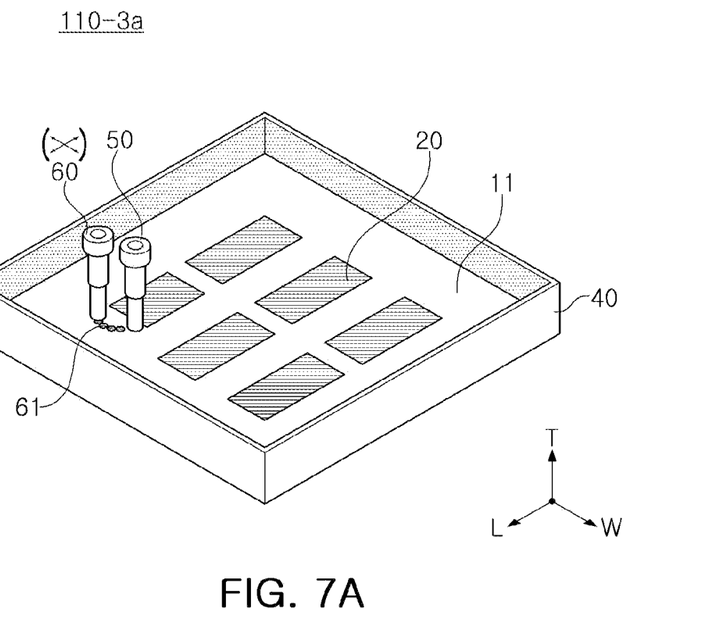
FIGS. 7A, 7B, 7C and 7D are perspective diagrams illustrating various examples of a process of forming at least one internal electrode with respect to a method of manufacturing a multilayer capacitor according to an example embodiment of the present disclosure.

Referring to FIG. 7A, the process 110-3a of forming the at least one dielectric layer 11 may include, after one of the plurality of internal electrodes 20 is formed on one of the plurality of dielectric layers 11, forming the other one of the plurality of dielectric layers 11 on one of the plurality of dielectric layers 11 while leaving a space (e.g., at least a portion of the margin taken in the L direction) in which one of the plurality of internal electrodes 20 is not formed.

The space (e.g., at least a portion of the margin taken in the L direction) in which one of the plurality of internal electrodes 20 is not formed may work as a limitation in maintaining the shape of the at least one dielectric layer 11, but since the guide frame 40 may maintain the shape of the at least one dielectric layer 11, $\{(\theta 1+\theta 2)/2\}$ in Table 1 may be reduced to more than 0 degrees and less than 15 degrees, or $\{T_B/(T_E+2*T_D)\}$ in Table 2 may increase to 0.8 or more and less than 1. Also, since the guide frame 40 may maintain the shape of the at least one dielectric layer 11, the first and second air gaps illustrated in FIG. 4 may be formed, but the method for manufacturing a multilayer capacitor according to an example embodiment is not limited thereto.

Figure 7B:
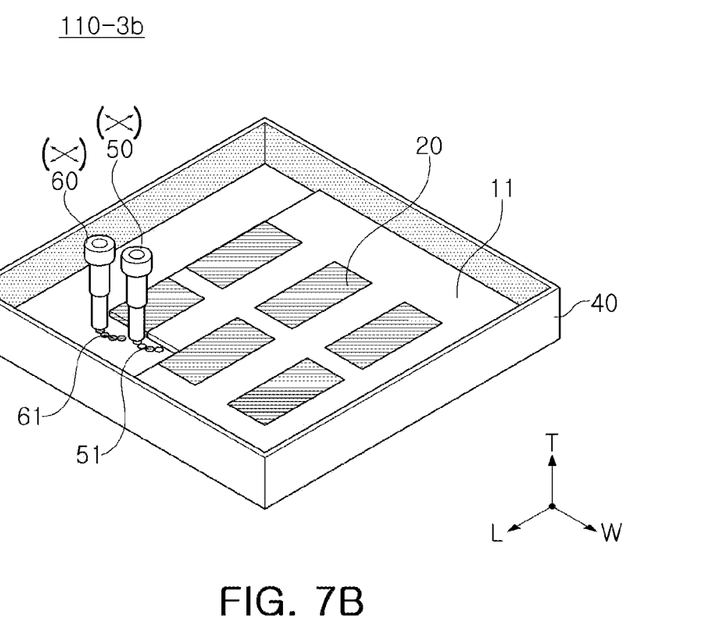

Referring to FIG. 7B, the dielectric 51 may be sprayed from the dielectric inkjet printhead 50 to at least a portion of the space (e.g., at least a portion of the margin taken in the L direction) in which the one of the plurality of internal electrodes 20 is not formed.

Figure 7C:
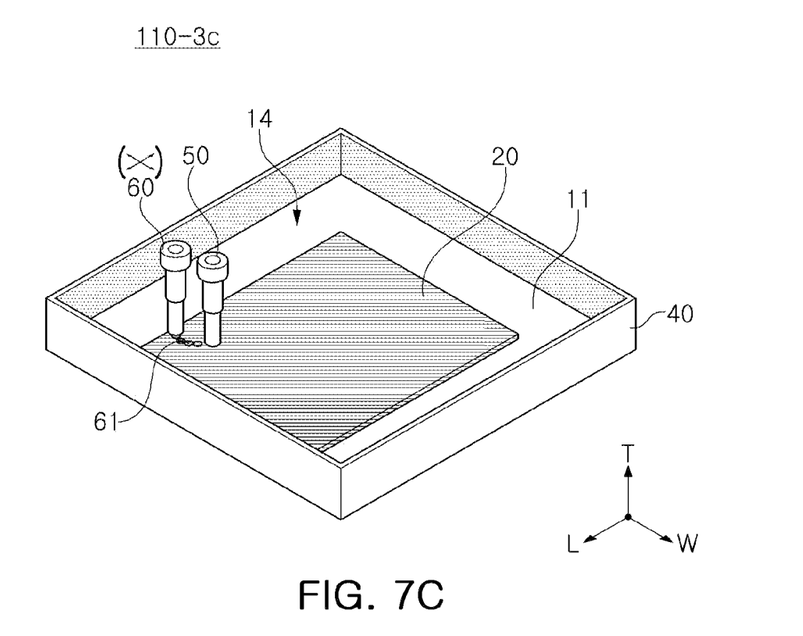
Figure 7D:
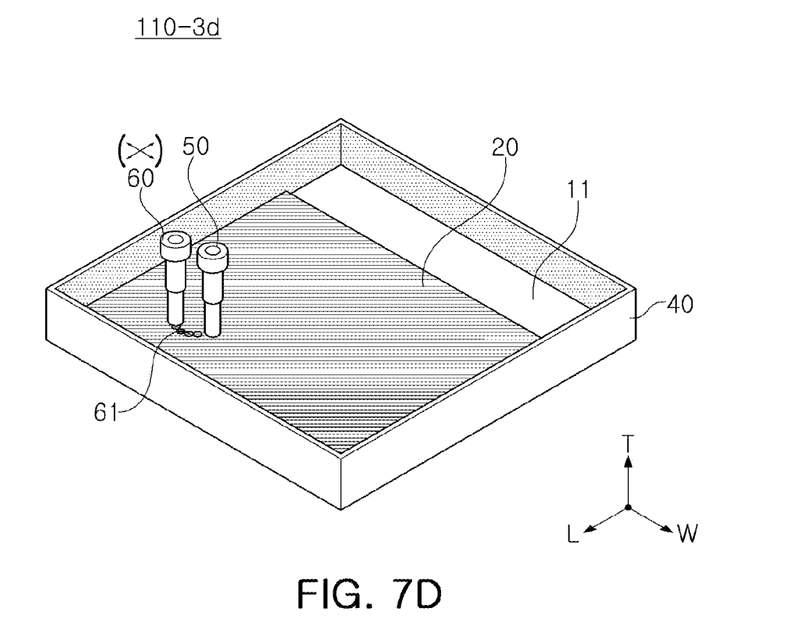

Referring to FIGS. 7C and 7D, the size of the at least one internal electrode 20 for the guide frame 40 may increase. For example, the size of the at least one internal electrode 20 may increase or the size of the guide frame 40 may decrease. Accordingly, the cutting process may not be performed.

Referring to FIG. 7D, in the process 110-3d of forming at least one internal electrode may include forming at least one internal electrode 20 such that at least a portion of each side surface thereof may be in contact with at least two surfaces of the guide frame 40. In example embodiments, the side margin layer may be formed on two side surfaces of at least one dielectric layer 11 after the guide frame 40 is separated, and the side margin layer may be at least a portion of the margin region 114 illustrated in FIG. 1.

Figure 8:
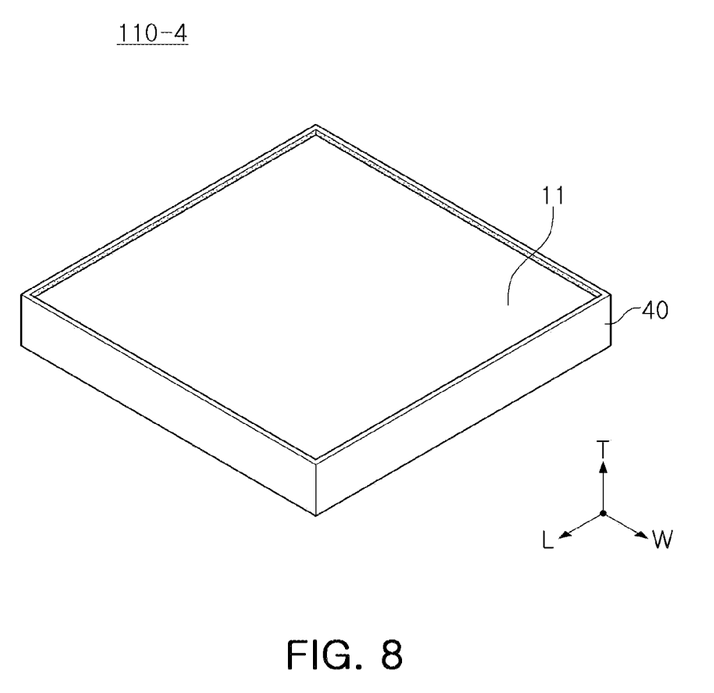
FIG. 8 is a perspective diagram illustrating a state before a guide frame is separated from a structure (a state in which the structure is able to be compressed) in which at least one dielectric layer and at least one internal electrode are laminated with respect to a method of manufacturing a multilayer capacitor according to an example embodiment of the present disclosure.

FIG. 8 is a perspective diagram illustrating a state before a guide frame is separated from a structure (a state in which the structure is able to be compressed) in which at least one dielectric layer and at least one internal electrode are laminated with respect to a method of manufacturing a multilayer capacitor according to an example embodiment.

Referring to FIG. 8, the method of manufacturing a multilayer capacitor according to an example embodiment may further include an additional process 110-4 such as compressing or baking in example embodiments.

Figure 9A:
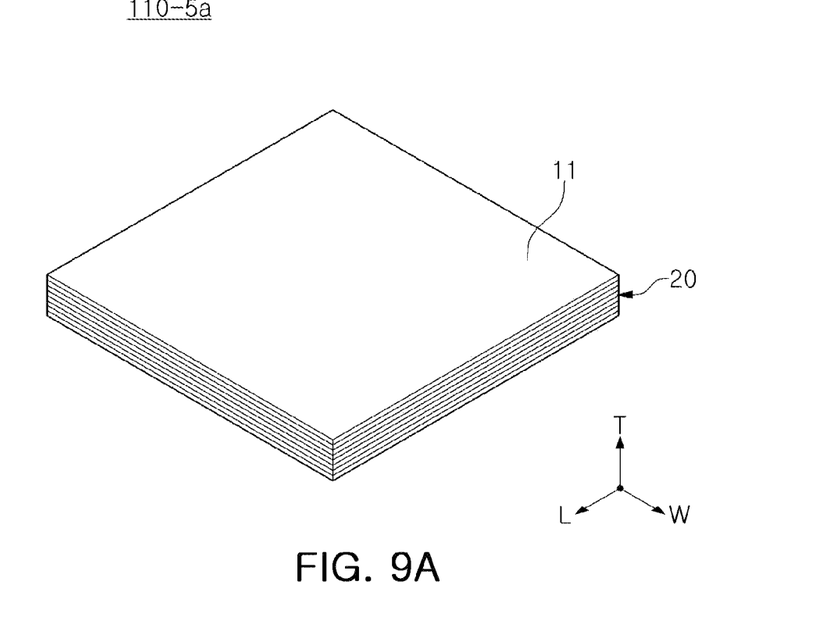
FIG. 9A is a perspective diagram illustrating a separation process of a method of manufacturing a multilayer capacitor according to an example embodiment of the present disclosure.
Figure 9B:
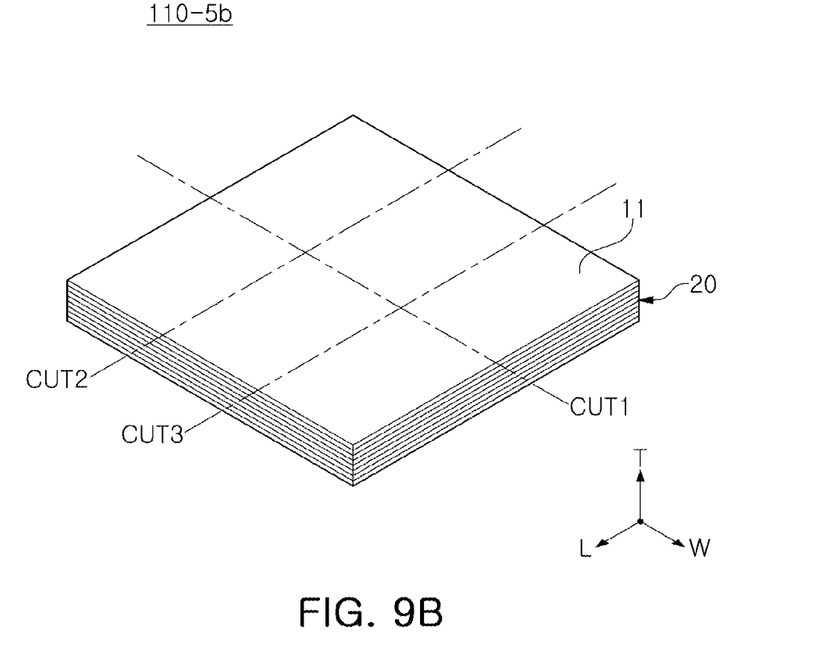
FIG. 9B is a perspective diagram illustrating a cutting process of a method of manufacturing a multilayer capacitor according to an example embodiment of the present disclosure.

That is, before the processes illustrated in FIGS. 9A and 9B, the structure in which at least one dielectric layer 11 and at least one internal electrode are laminated may be compressed and may be baked in a first direction (e.g., T direction). In example embodiments, the laminate structure may further include an upper cover layer and/or a lower cover layer illustrated in FIG. 1.

FIG. 9A is a perspective diagram illustrating a separation process of a method of manufacturing a multilayer capacitor according to an example embodiment.

Referring to FIG. 9A, the method of manufacturing a multilayer capacitor according to an example embodiment may include a process 110-5a of separating at least two surfaces of a guide frame from at least one dielectric layer 11.

When the guide frame includes a lower surface, the guide frame may be configured such that at least four surfaces may be separated from a lower surface. That is, only a portion of the guide frame may be separated from the at least one dielectric layer 11.

FIG. 9B is a perspective diagram illustrating a cutting process of a method of manufacturing a multilayer capacitor according to an example embodiment.

Referring to FIG. 9B, the method of manufacturing a multilayer capacitor according to an example embodiment may include, after the process 110-5a of separating, a process 110-5b of cutting the structure in which at least one dielectric layer 11 and at least one internal electrode are laminated, For example, the laminate structure may be cut along cut-out surfaces CUT1, CUT2, and CUT3 to be divided by the number (e.g., six) of the internal electrodes 20 illustrated in FIGS. 7A and 7B.

According to the aforementioned example embodiments, the multilayer capacitor and the method of manufacturing the same may be advantageous for miniaturization for performance (e.g., capacitance, manufacturing cost, reliability, withstand voltage, and mounting efficiency).

While the example embodiments have been illustrated and described above, it will be apparent to those skilled in the art that modifications and variations could be made without departing from the scope of the present invention as defined by the appended claims.

What is claimed is:

1. A method of manufacturing a multilayer capacitor, the method comprising:
preparing a guide frame;
forming at least one dielectric layer between at least two surfaces of the guide frame such that at least a portion of each side surface of the at least one dielectric layer is in contact with the at least two surfaces of the guide frame;
forming at least one internal electrode on an upper surface of the at least one dielectric layer between the at least two surfaces of the guide frame using an inkjet printing method; and
separating the at least two surfaces of the guide frame from the at least one dielectric layer,
wherein the forming at least one internal electrode and the forming at least one dielectric layer are alternately performed two or more times by the inkjet printing method to form a plurality of internal electrodes and a plurality of dielectric layers.

2. The method of claim 1,
wherein the guide frame includes at least four surfaces surrounding the at least one dielectric layer and the at least one internal electrode and in contact with at least a portion of each side surface of the at least one dielectric layer, and
wherein the at least four side surfaces include the at least two surfaces.

3. The method of claim 2, wherein the guide frame further includes a lower surface supporting the at least one dielectric layer and the at least one internal electrode.

4. The method of claim 3, wherein the lower surface of the guide frame includes a thermoplastic insulating material, different from a material of the at least four surfaces.

5. The method of claim 3, wherein the separating includes separating the at least four surfaces from the lower surface of the guide frame.

6. The method of claim 1, wherein the separating includes separating the at least two surfaces of the guide frame from the at least one dielectric layer after a structure in which the at least one dielectric layer and the at least one internal electrode are laminated is compressed in a lamination direction.

7. The method of claim 1, further comprising, after the separating the at least two surfaces of the guide frame from the at least one dielectric layer, cutting a structure in which the at least one dielectric layer and the at least one internal electrode are laminated.

8. The method of claim 1, wherein the forming at least one internal electrode includes forming the at least one internal electrode such that at least a portion of each side surface of the at least one internal electrode is in contact with the at least two surfaces of the guide frame.

9. The method of claim 1,
wherein the forming at least one dielectric layer includes, after one of the plurality of internal electrodes is formed on one of the plurality of dielectric layers, forming another one of the plurality of dielectric layers while leaving a space in which the one of the plurality of internal electrodes is not formed on the one of the plurality of dielectric layers.

10. The method of claim 1, wherein the forming at least one internal electrode includes forming the at least one internal electrode such that each of the at least one internal electrode has a thickness of 0.25 µm or less.

* * * * *